(No Model.)   5 Sheets—Sheet 1.
F. VAN DORN.
COTTON HARVESTER.
No. 444,801.   Patented Jan. 13, 1891.
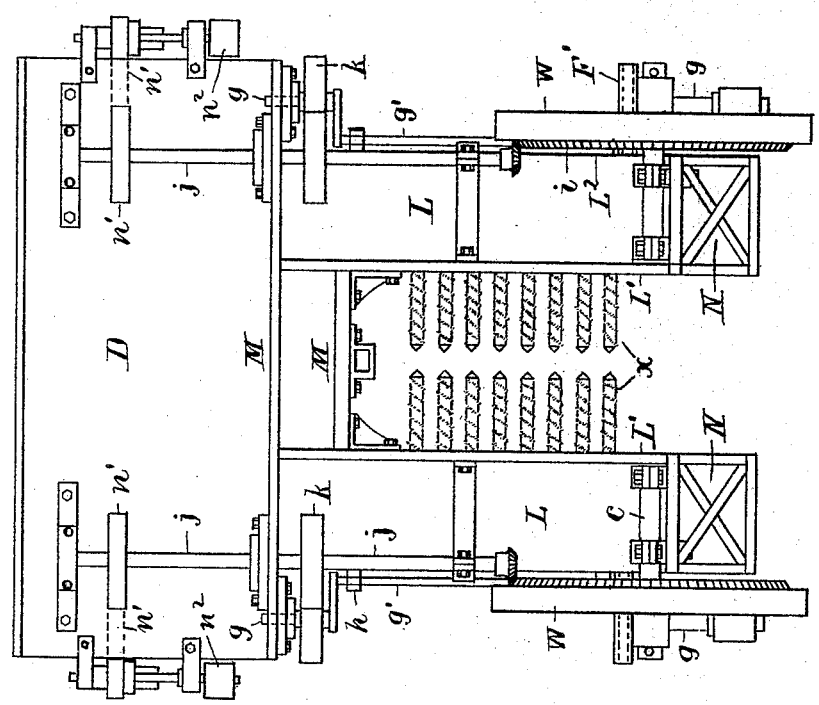
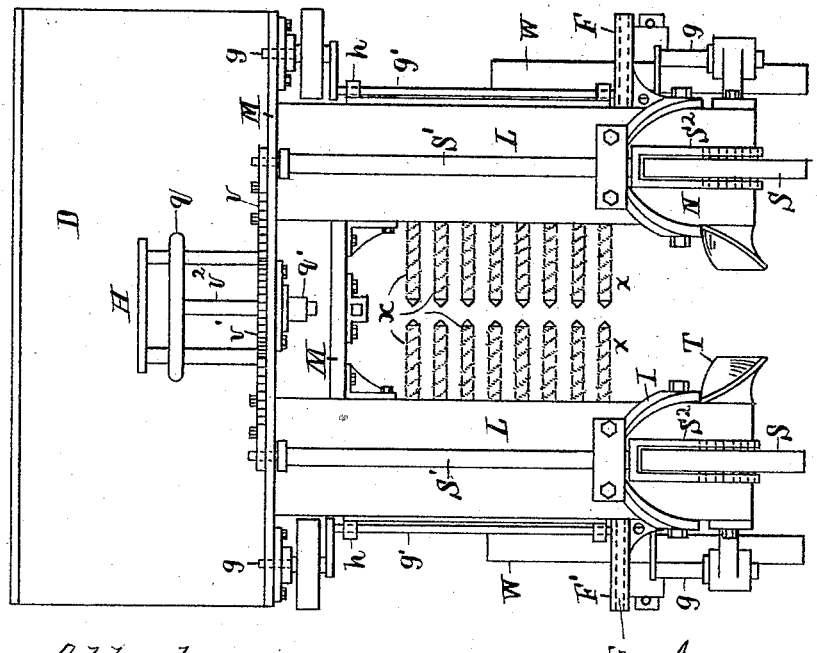
Attest:
L. Lee
F. C. Fischer
Inventor:
Ferdinand Van Dorn,
per Crane & Miller, attys.

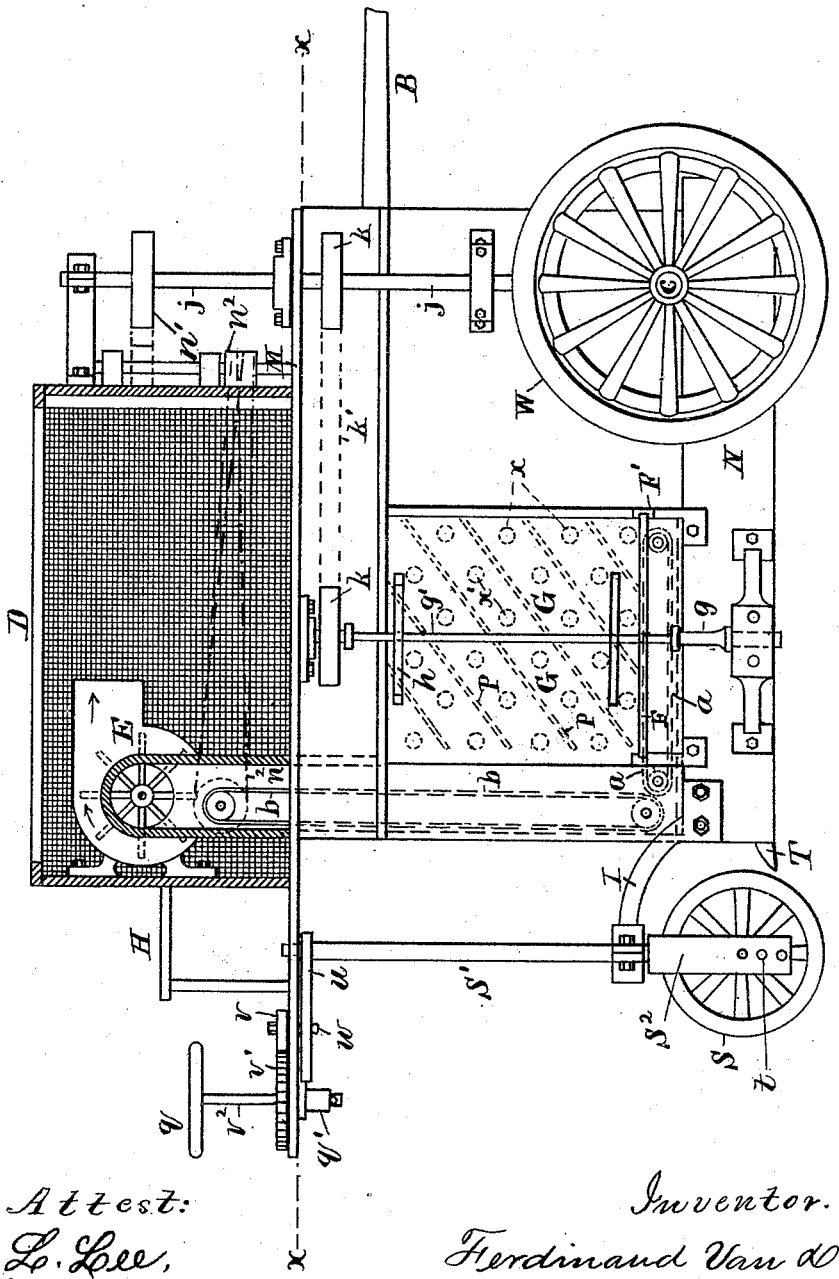

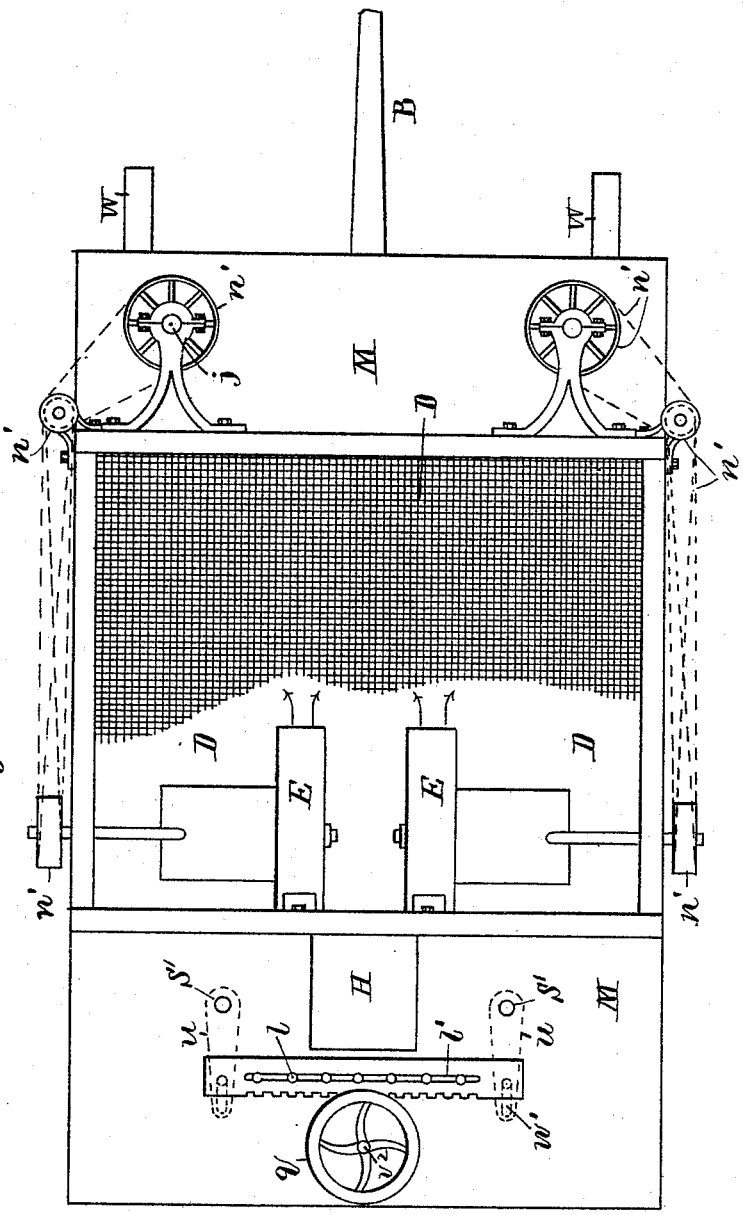

(No Model.) 5 Sheets—Sheet 4.
F. VAN DORN.
COTTON HARVESTER.
No. 444,801. Patented Jan. 13, 1891.
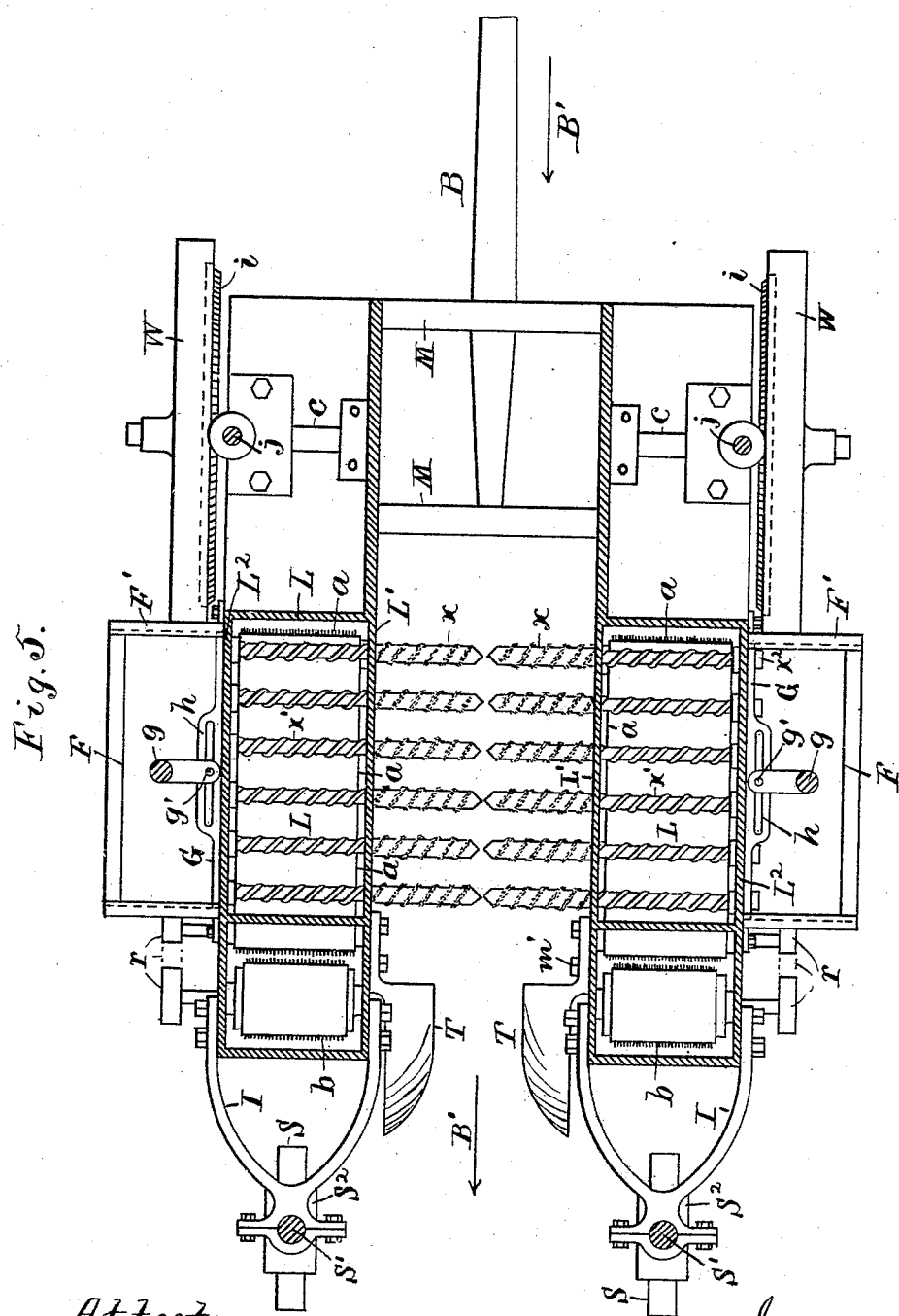
Attest:
L. Lee
F. C. Fischer
Inventor.
Ferdinand Van Dorn,
per Crane & Miller, Attys.

(No Model.) 5 Sheets—Sheet 5.
F. VAN DORN.
COTTON HARVESTER.
No. 444,801. Patented Jan. 13, 1891.
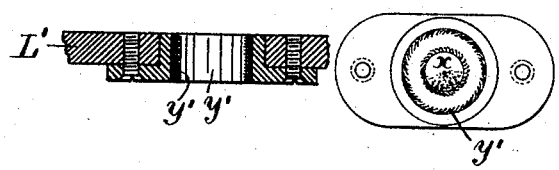
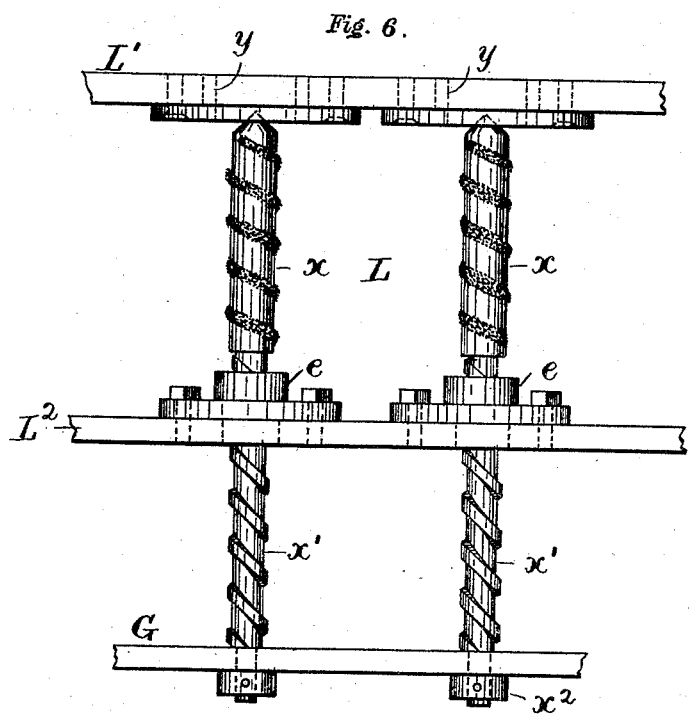
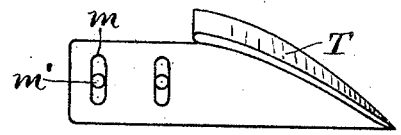
Attest:
L. Lee.
F. C. Fischer.
Inventor.
Ferdinand Van Dorn,
per Crane & Miller, Attys.

UNITED STATES PATENT OFFICE.

FERDINAND VAN DORN, OF BASKING RIDGE, NEW JERSEY.

COTTON-HARVESTER.

SPECIFICATION forming part of Letters Patent No. 444,801, dated January 13, 1891.

Application filed August 22, 1890. Serial No. 362,724. (No model.)

*To all whom it may concern:*

Be it known that I, FERDINAND VAN DORN, a citizen of the United States, residing at Basking Ridge, Somerset county, New Jersey, have invented certain new and useful Improvements in Cotton-Harvesters, fully described and represented in the following specification and the accompanying drawings, forming a part of the same.

This invention relates to certain improvements in the means of actuating the picking-fingers of a cotton-harvester, the means of collecting the cotton from such fingers, and improvements relating to the steering devices and other parts of the apparatus. The picking-fingers are rotated alternately in opposite directions and simultaneously projected from apertures through the side of the cotton-chest into the cotton-bush. The teeth upon the fingers are so inclined as to gather the cotton while the fingers are being retracted from the bush and drawn within the cotton-chest; but the reverse rotation of the fingers within the chest serves to discharge the cotton from the fingers inside the chest. To operate effectively upon the cotton plant, several series of fingers are provided in the cotton-chest, and to facilitate the removal of the cotton from the chest inclined partitions are inserted between the several fingers, dividing the chest into sloping channels in which only a small quantity of cotton is discharged. The cotton is withdrawn from the chest by picker-belts, which deliver it to a suction-fan, by which it is discharged into a receptacle having gauze exterior. The suction of the fan operates to draw air into the apertures through which the picker-fingers are reciprocated, and such atmospheric pressure operates to sweep out the channels in which the cotton is deposited and to deliver the cotton to the picker-belts. The atmospheric pressure also operates to strip the cotton from the picker-belts when it is delivered near the inlet of the fan, and the belts and channels are thus prevented from clogging with the cotton.

The invention will be understood by reference to the annexed drawings, in which—

Figure 1 is an elevation at the front end of a harvester constructed with my improvements. Fig. 2 is an elevation at the rear end. Fig. 3 is a side elevation with the gauze removed from one side of the cotton-receptacle, and the cover removed from the vertical picker-belt to expose the same. Fig. 4 is a plan of the apparatus with a portion of the gauze covering removed at the top of the cotton-receptacle to expose the suction-fans. Fig. 5 is a plan of the machine in section below the line $x\,x$ in Fig. 3. Fig. 6 is an illustration upon a larger scale of two of the picker-fingers and the adjacent parts for operating the same. Fig. 7 is an end view of the picker-finger and the bush removed from the aperture through which it operates. Fig. 8 is a horizontal section through such bush and the front of the cotton-chest adjacent thereto, and Fig. 9 is a side elevation of one of the adjustable guide-plates for raising the branches.

The apparatus is best operated with two cotton-chests sustained by suitable framing and propelled along the opposite sides of a row of cotton-bushes, into the opposite sides of which the picking-fingers are intermittingly thrust; but my improvements in the picking mechanism may be used with a single chest propelled at one side of the cotton-bushes.

In the drawings, L are the cotton-chests; L′, the front plates of the same, adjacent to the cotton-bushes and provided with finger-apertures $y$, and $L^2$ the rear plates of the same, to which are attached the nuts $e$ for rotating the picker-fingers.

The cotton-chests are connected at the bottom each with a frame N, to which the supporting-wheels W are pivoted upon stationary studs $c$.

A frame M connects the cotton-chests above the tops of the bushes, and consists in cross-bars and a platform to carry the cotton-receptacle D.

A wagon-pole B is shown at the rear of the chests in Fig. 5, attached to such cross-bars, and the animals for propelling the machine would be attached to such pole in the rear of the apparatus to move it in the direction of the arrows B′, as is common with cotton-harvesters.

The picking-fingers $x$ are provided with shanks $x'$, having coarse threads fitted to the nuts $e$ in the back of the cotton-chests, and the ends of the shanks are provided with collars $x^2$ and swiveled in a carrier-plate G. The carrier is provided at the bottom with a guide-flange F, fitted to guides F′, projected from the rear side of the cotton-chest, and a shaft $g$, provided with a crank $g'$, is mounted adjacent to the carrier, and the crank fitted to a slotted bar $h$, affixed to the carrier at the top and bottom.

To each driving-wheel W is attached a cog-wheel $i$, which operates a vertical shaft $j$ at a considerable increased speed. The crank-shaft $g$ is driven from the shaft $j$ by pulleys $k$ and belt $k'$, and the crank $g'$ operates to reciprocate the carrier G to and from the rear side $L^2$ of the cotton-chest L. The outward movement of the carrier draws the fingers $x$ through the apertures $y$ inside of the chest and simultaneously rotates them to gather the cotton. The cotton is thus drawn within the chest, where it is released from the picker teeth by the abrupt reversal of its rotations when the carrier is moved toward the chest to project the fingers anew through the apertures $y$.

In Figs. 7 and 8 is shown a bushing for the apertures $y$, with teeth $y'$ inclined in a reverse direction to those upon the fingers $x$ to strip from the fingers any cotton that is not dislodged within the chest. Such cotton is retained by the teeth $y'$ until the finger is again drawn within the chest, when its rotation in a reverse direction to the teeth $y'$ would strip the cotton from the same and carry it into the chest. The apertures and fingers are so disposed that inclined partitions P may be arranged within the chest to divide the same into sloping channels open at the top and one side.

A picker-belt $a$ is arranged in the bottom of the chest to gather the cotton falling thereon, and is operated to deliver the cotton to a vertical picker-belt $b$, which carries such cotton, with that delivered from the side of the chest, upward to the inlet of a rotary fan E. Such fan is located within the cotton-receptacle D, and its suction draws the cotton from the belt $b$ and discharges it into the receptacle where it is retained by gauze walls, which permit the escape of the air.

The picker-belts are connected together by pulleys and belt $r$, (shown only in Fig. 5,) and the vertical belt and the fan E are driven by suitable pulleys and belting $n'$ and $n^2$ from the upright shaft $j$, Figs. 3 and 4, the belts being shown by dotted lines to distinguish them from the framing of the machine.

The machine, being propelled from the rear, requires a steering apparatus in front, which is furnished by two steering-wheels S, secured in forked bearings $S^2$, upon the lower ends of steering-shafts S′ at opposite sides of the cotton-bushes.

The lower ends of the shafts are sustained by brackets I, and their upper ends run in bearings secured to the platform, and arms $u$ are projected from the tops of the two shafts and connected by a rack $v$, having pins $w$ fitted to slots $w'$ in the arms. A pinion $v'$ and hand-wheel $q$ are fixed to a shaft $v^2$, pivoted in a bearing $q'$ upon the front of the platform, and a seat H is provided upon the platform adjacent to the wheel upon which the operator may sit to turn the wheel $q$.

The rack is guided upon the platform by bolts $l$, fitted to a slot $l'$ in the rack, and operates to turn the steering-wheels $s$ simultaneously in the same direction when the wheel $q$ is rotated.

The forked bearings for the steering-wheels are provided with a vertical series of holes $t$, in any of which the axle of the steering-wheel may be inserted at pleasure to adjust the height of the machine from the ground at the forward end. The picker-fingers may thus be arranged to operate most advantageously upon the plant Adjustable guide-plates T are shown attached to the frame N near the front of the machine to raise the branches of the cotton-plants from the ground, such guides being adjustably attached to the machine by slotted foot-pieces $m$ and bolts $m'$, Figs. 5 and 9. By the slotted foot-pieces the guides may be adjusted at any required height, according to the condition of the cotton-plants.

By the various improvements described herein the machine may be operated conveniently and effectively and the cotton gathered with great efficiency.

The most essential feature of the invention is the series of picker-fingers rotated in opposite directions and projected intermittingly from apertures in the cotton-chest, with a suction mechanism operating to remove the cotton from such fingers and from the channels in which it is deposited. Without such assistance from a blast of air the cotton is liable to clog either the fingers or the channels.

Having thus set forth the nature of my invention, what I claim herein is—

1. In a cotton-harvester, the combination, with the cotton-chest L, provided with apertures $y$ in the front, of the series of nuts $e$, the rotary fingers $x$, arranged in line with the apertures, with threaded shanks $x'$ fitted to the nuts, and the carrier G, having the shanks swiveled therein and reciprocated to and from the outer side of the chest to intermittingly project the fingers from the apertures, substantially as herein set forth.

2. In a cotton-harvester, the combination, with the chest L, provided with the apertures $y$ and nuts $e$, of the series of fingers with threaded shanks fitted to the nuts, the reciprocating carrier G, having shanks swiveled therein, the inclined partitions P between the series of fingers, a cotton-receptacle D, with gauze exterior, and a fan for drawing the cotton from the chest and discharging it into the receptacle, substantially as herein set forth.

3. In a cotton-harvester, the combination, with the chests L, connected by the frame M and provided with apertures $y$ and nuts $e$, as described, of the cotton-receptacle mounted over the chest with gauze exterior, the picking-fingers having threaded shanks fitted to the nuts $e$, the reciprocating carrier G, with the shanks swiveled therein, the inclined partitions in the chests, the fans located within the cotton-receptacles and having their inlets connected with the chests, the supporting-wheels W, and suitable gearing connecting the wheels with the fans E, substantially as herein set forth.

4. In a cotton-harvester, the combination, with the chests L, provided with apertures $y$ and nuts $e$, and the rotary fingers having shanks fitted to the nuts and reciprocated in and out of the apertures, as set forth, of the frame M, connecting the chests, the wheels W, supporting the frame, the steering-wheels S, and the steering-shafts S', provided with forked bearings $S^2$, having the series of holes $t$ for the axles of the steering-wheels, substantially as herein set forth.

5. In a cotton-harvester, the combination, with the chests L, provided with apertures $y$ and nuts $e$, and the rotary fingers having shanks fitted to the nuts and reciprocated in and out of the apertures, as set forth, of the frame M, connecting the chests, the wheels W, supporting the frame, the adjustable guide-plates T, the steering-wheels S, the shafts S', provided with forked bearings and with lever-arms $u$, the rack $v$, connecting the arms and the pinion $v'$, and hand-wheel $q^2$ for actuating the same, as and for the purpose set forth.

6. In a cotton-harvester, the combination, with the chest L, provided with the apertures $y$ and the reciprocating rotary fingers, as set forth, the inclined partitions in the chest, and the cotton-receptacle over the chest, with suction-fan located therein, of the horizontal and vertical belts $a$ and $b$, arranged as described and adapted to elevate the cotton to the inlet of the fan, as and for the purpose set forth.

In testimony whereof I have hereunto set my hand in the presence of two subscribing witnesses.

FERD. VAN DORN.

Witnesses:
HARRY R. RICHARDS,
H. C. PITNEY, Jr.